(12) United States Patent
Rajaram (10) Patent No.: US 7,328,007 B2
(45) Date of Patent: Feb. 5, 2008

(54) SYSTEM AND METHOD FOR ORGANIZING WIRELESS COMMUNICATION DEVICE SYSTEM SOFTWARE

(75) Inventor: Gowri Rajaram, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 443 days.

(21) Appl. No.: 09/917,026

(22) Filed: Jul. 26, 2001

(65) Prior Publication Data

US 2003/0022665 A1    Jan. 30, 2003

(51) Int. Cl.
*H04M 3/00*    (2006.01)

(52) U.S. Cl. .................. 455/420; 455/419; 455/550.1; 717/173; 717/169; 709/246

(58) Field of Classification Search ........ 455/418–420, 455/550.1; 717/1, 68, 168–178; 709/246; 375/259, 295, 316; 719/331–332; 713/191
See application file for complete search history.

(56) References Cited

U.S. PATENT DOCUMENTS

| | | | |
|---|---|---|---|
| 5,046,082 A | | 9/1991 | Zicker et al. |
| 5,337,255 A | * | 8/1994 | Seidel et al. .................. 716/17 |
| 5,400,389 A | | 3/1995 | Niiyama et al. |
| 5,481,706 A | * | 1/1996 | Peek .......................... 710/200 |
| 5,507,009 A | | 4/1996 | Grube et al. |
| 5,600,823 A | * | 2/1997 | Sherer et al. ................. 703/20 |
| 5,673,317 A | | 9/1997 | Cooper |
| 5,699,275 A | | 12/1997 | Beasley et al. |
| 5,715,462 A | | 2/1998 | Iwamoto et al. |
| 5,734,904 A | | 3/1998 | Kanamori et al. |
| 5,771,386 A | | 6/1998 | Baumbauer |
| 5,784,537 A | | 7/1998 | Suzuki et al. |
| 5,790,704 A | | 8/1998 | Rao et al. |
| 5,790,856 A | | 8/1998 | Lillich |
| 5,832,086 A | | 11/1998 | Rosauer |

(Continued)

FOREIGN PATENT DOCUMENTS

DE        19502728        8/1996

(Continued)

OTHER PUBLICATIONS

International Search Report (ISR): PCT/ISA/210 for International Application No. PCT/IB02/02867, ISR dated Oct. 28, 2003, 4 pages.

(Continued)

*Primary Examiner*—George Eng
*Assistant Examiner*—Marcos L. Torres (57) ABSTRACT

A system and method are provided for organizing field upgradeable system software in a wireless communications device. The software is organized into a first plurality of symbol libraries or code sections. Contiguously addressed memory blocks store the symbol libraries or code sections. The start addresses of code sections or symbol libraries are stored in a code section address table cross-referencing code section identifiers with corresponding start addresses. Each symbol is offset from its respective code section start address. Symbol identifiers are cross-referenced with corresponding offset addresses, and corresponding code section identifiers in a symbol offset address table. A symbol accessor code is used to identify symbol addresses using the code section address table and the symbol offset address table.

13 Claims, 5 Drawing Sheets

U.S. PATENT DOCUMENTS

| | | | |
|---|---|---|---|
| 5,835,778 A | 11/1998 | Yoshihara | |
| 5,875,242 A | 2/1999 | Glaser et al. | |
| 5,920,826 A | 7/1999 | Metso et al. | |
| 5,930,704 A | 7/1999 | Kay | |
| 5,938,766 A | 8/1999 | Anderson et al. | |
| 5,960,356 A | 9/1999 | Alperovich et al. | |
| 5,974,312 A | 10/1999 | Hayes et al. | |
| 6,018,543 A | 1/2000 | Blois et al. | |
| 6,023,620 A * | 2/2000 | Hansson | 455/419 |
| 6,026,400 A | 2/2000 | Suzuki | |
| 6,047,071 A | 4/2000 | Shah | |
| 6,138,009 A | 10/2000 | Birgerson | |
| 6,138,153 A | 10/2000 | Collins et al. | |
| 6,145,098 A | 11/2000 | Nouri et al. | |
| 6,195,546 B1 | 2/2001 | Leung et al. | |
| 6,247,065 B1 | 6/2001 | Greenspan et al. | |
| 6,272,333 B1 | 8/2001 | Smith | |
| 6,275,694 B1 | 8/2001 | Yoshida et al. | |
| 6,308,061 B1 | 10/2001 | Criss et al. | |
| 6,351,636 B2 | 2/2002 | Shaffer et al. | |
| 6,415,266 B1 | 7/2002 | Do | |
| 6,442,660 B1 | 8/2002 | Henerlau et al. | |
| 6,449,476 B1 * | 9/2002 | Hutchison et al. | 455/418 |
| 6,457,174 B1 * | 9/2002 | Kuroda et al. | 717/162 |
| 6,460,070 B1 | 10/2002 | Turek et al. | |
| 6,470,447 B1 | 10/2002 | Lambert et al. | |
| 6,493,549 B1 | 12/2002 | Axelson et al. | |
| 6,493,871 B1 | 12/2002 | McGuire et al. | |
| 6,498,789 B1 * | 12/2002 | Honda | 370/342 |
| 6,546,492 B1 | 4/2003 | Walker et al. | |
| 6,549,770 B1 | 4/2003 | Marran | |
| 6,578,056 B1 | 6/2003 | Lamburt | |
| 6,578,142 B1 | 6/2003 | Anderson et al. | |
| 6,622,017 B1 | 9/2003 | Hoffman | |
| 6,633,759 B1 | 10/2003 | Kobayashi | |
| 6,643,506 B1 | 11/2003 | Criss et al. | |
| 6,714,992 B1 | 3/2004 | Kanojia et al. | |
| 6,731,946 B1 | 5/2004 | Stanwood et al. | |
| 6,754,894 B1 * | 6/2004 | Costello et al. | 717/169 |
| 6,754,895 B1 | 6/2004 | Bartel et al. | |
| 6,763,252 B2 | 7/2004 | Itazawa | |
| 6,785,541 B2 | 8/2004 | Martin | |
| 6,950,847 B2 | 9/2005 | Harrisville-Wolff et al. | |
| 6,959,192 B1 | 10/2005 | Cannon et al. | |
| 6,990,660 B2 | 1/2006 | Moshir et al. | |
| 7,065,347 B1 | 6/2006 | Vikse et al. | |
| 2001/0000538 A1 | 4/2001 | Kowaguchi | |
| 2001/0005861 A1 | 6/2001 | Mousseau et al. | |
| 2001/0019953 A1 | 9/2001 | Furukawa et al. | |
| 2001/0027500 A1 | 10/2001 | Matsunaga | |
| 2001/0051519 A1 * | 12/2001 | Shirai | 455/419 |
| 2001/0054161 A1 | 12/2001 | Wooddruff | |
| 2002/0019973 A1 | 2/2002 | Hayashida | |
| 2002/0026634 A1 * | 2/2002 | Shaw | 717/173 |
| 2002/0065041 A1 | 5/2002 | Lunsford et al. | |
| 2002/0072359 A1 | 6/2002 | Moles et al. | |
| 2002/0077077 A1 | 6/2002 | Rezvani et al. | |
| 2002/0083142 A1 | 6/2002 | Lagosanto et al. | |
| 2002/0083143 A1 | 6/2002 | Cheng | |
| 2002/0131397 A1 | 9/2002 | Patel et al. | |
| 2002/0142762 A1 | 10/2002 | Chmaytelli et al. | |
| 2002/0152268 A1 | 10/2002 | Kureshy et al. | |
| 2002/0160763 A1 | 10/2002 | Mittal et al. | |
| 2002/0161796 A1 | 10/2002 | Sylthe | |
| 2002/0170039 A1 | 11/2002 | Kovacevic | |
| 2003/0014561 A1 | 1/2003 | Cooper | |
| 2003/0060189 A1 * | 3/2003 | Minear et al. | 455/411 |
| 2003/0195013 A1 | 10/2003 | Zicker et al. | |
| 2004/0158829 A1 | 8/2004 | Beresin et al. | |
| 2004/0177072 A1 | 9/2004 | Salminen et al. | |
| 2004/0203768 A1 | 10/2004 | Ylitalo et al. | |
| 2004/0214551 A1 | 10/2004 | Kim | |
| 2004/0229644 A1 | 11/2004 | Heie et al. | |
| 2004/0240657 A1 | 12/2004 | Camarillo | |
| 2004/0249657 A1 | 12/2004 | Kol et al. | |
| 2004/0249768 A1 | 12/2004 | Kontio et al. | |
| 2004/0266422 A1 | 12/2004 | Hotze et al. | |
| 2005/0064847 A1 | 3/2005 | Kirbas et al. | |
| 2005/0079863 A1 | 4/2005 | Macaluso | |
| 2005/0209930 A1 | 9/2005 | Coppinger et al. | |

FOREIGN PATENT DOCUMENTS

| | | |
|---|---|---|
| DE | 19543843 | 5/1997 |
| DE | 19850133 | 5/1999 |
| EP | 0459344 | 12/1991 |
| EP | 0889405 | 1/1999 |
| EP | 0918420 | 5/1999 |
| EP | 1014263 | 6/2000 |
| FR | 2800963 | 5/2001 |
| GB | 2227584 | 8/1990 |
| GB | 2349485 | 11/2000 |
| WO | WO 9300633 | 1/1993 |
| WO | WO 98/09208 | 3/1998 |
| WO | WO 9922325 | 5/1999 |
| WO | WO 0067112 | 11/2000 |
| WO | WO 0073912 | 12/2000 |
| WO | WO 0074412 | 12/2000 |
| WO | WO 0135686 | 5/2001 |
| WO | WO 02058364 | 7/2002 |

OTHER PUBLICATIONS

Guiagoussou et al., "Implementation of a Diagnostic and Troubleshooting Multi-Agent System for Cellular Networks", Int'l J Network Mgmnt., pp. 221-237, Aug. 1999.

* cited by examiner

| Code Section Address Table ||
| Code Section Identifier | Addresses |
| --- | --- |
| CS-1 | Start Address 1 (00100) |
| CS-2 | Start Address 2 (00200) |
| ⋮ | |
| CS-n | Start Address n (00700) |
| Pm | Start Address P (01000) |

Symbol Library 1

| Symbol Offset Address Table |||
| Symbol ID | Code Section ID | Offset |
| --- | --- | --- |
| X_1 | CS_1 | 03 |
| Y_1 | CS_1 | 15 |
| P_1 | CS_2 | 11 |
| Q_1 | CS_2 | 33 |
| AA_3 | CS_2 | 47 |
| ⋮ | | |

SYSTEM AND METHOD FOR ORGANIZING WIRELESS COMMUNICATION DEVICE SYSTEM SOFTWARE

BACKGROUND OF THE INVENTION

1. Field of the Invention

This invention generally relates to wireless communications devices and, more particularly, to a system and method of organizing software in a manner that permits updates and changes to be made to the system software of a wireless communications device in the field, via an airlink interface.

2. Description of the Related Art

It is not uncommon to release software updates for phones that are already in the field. These updates may relate to problems found in the software once the phones have been manufactured and distributed to the public. Some updates may involve the use of new features on the phone, or services provided by the service provider. Yet other updates may involve regional problems, or problems associated with certain carriers. For example, in certain regions the network layout of carriers may impose airlink interface conditions on the handset that cause the handset to demonstrate unexpected behavior such as improper channel searching, improper call termination, improper audio, or the like.

The traditional approach to such updates has been to recall the wireless communications device, also referred to herein as a wireless device, phone, telephone, or handset, to the nearest carrier retail/service outlet, or to the manufacturer to process the changes. The costs involved in such updates are extensive and eat into the bottom line. Further, the customer is inconvenienced and likely to be irritated. Often times, the practical solution is to issue the customer new phones.

It would be advantageous if wireless communications device software could be upgraded cheaply, and without inconvenience to the customer.

It would be advantageous if wireless communications device software could be upgraded without the customer losing the use of their phones for a significant period of time.

It would be advantageous if wireless communications device software could be updated with a minimum of technician service time, or without the need to send the device into a service facility.

It would be advantageous if the wireless device software could be organized to permit field modifications via an airlink interface.

SUMMARY OF THE INVENTION

Wireless communications device software updates give customers the best possible product and user experience. An expensive component of the business involves the recall of handsets to update the software. These updates may be necessary to offer the user additional services or to address problems discovered in the use of the phone after it has been manufactured. The present invention makes it possible to practically upgrade handset software in the field, via the airlink interface.

Accordingly, a method is provided for organizing field upgradeable system software in a wireless communications device. The method comprises: forming system software code into a first plurality of symbol libraries, each library comprising symbols having related functionality; arranging the first plurality of symbol libraries into a second plurality of code sections so that symbol libraries start at the start of code sections; creating a second plurality of contiguously addressed memory blocks; identifying each memory block with a corresponding code section; storing code sections in the identified memory blocks, with the start of code sections at corresponding start addresses; maintaining a code section address table cross-referencing code section identifiers with corresponding start addresses; and, executing the wireless device system software.

Forming system software code into a first plurality of symbol libraries includes forming a symbol accessor code. Arranging the first plurality of symbol libraries into a second plurality of code sections includes arranging each symbol to be offset from its respective code section start address, and includes arranging the symbol accessor code in a first code section. Then, the method further comprises: maintaining a symbol offset address table cross-referencing symbol identifiers with corresponding offset addresses, and corresponding code section identifiers; and, storing the symbol accessor code address in a first location in memory.

The code section address table, the symbol offset address table, and read-write data for all the symbol libraries, the symbol accessor code which calculates the addresses of symbols in the library while executing the system software, and the and symbol accessor code address are arranged as symbol libraries in a common code section, typically a patch manager code section. The read-write data, the code section address table, the symbol offset address table, the symbol accessor code address, and the symbol accessor code are loaded and accessed from random access volatile read-write memory.

The code sections are sized to accommodate arranged symbol libraries, or to be larger than the arranged symbol libraries, in case the symbol libraries are updated with larger libraries. The contiguously addressed memory blocks exactly accommodate the corresponding code sections.

Additional details of the above-described method, and a wireless communications device field upgradeable system software structure, are provided below.

DETAILED DESCRIPTION OF THE PREFERRED EMBODIMENTS

Some portions of the detailed descriptions that follow are presented in terms of procedures, steps, logic blocks, codes, processing, and other symbolic representations of operations on data bits within a wireless device microprocessor or memory. These descriptions and representations are the means used by those skilled in the data processing arts to most effectively convey the substance of their work to others skilled in the art. A procedure, microprocessor executed step, application, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a microprocessor based wireless device. It has proven convenient at times, principally for reasons of common usage, to refer to these signals as bits, values, elements, symbols, characters, terms, numbers, or the like. Where physical devices, such as a memory are mentioned, they are connected to other physical devices through a bus or other electrical connection. These physical devices can be considered to interact with logical processes or applications and, therefore, are "connected" to logical operations. For example, a memory can store or access code to further a logical operation.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "connecting" or "translating" or "displaying" or "prompting" or "determining" or "displaying" or "recognizing" or the like, refer to the action and processes of in a wireless device microprocessor system that manipulates and transforms data represented as physical (electronic) quantities within the computer system's registers and memories into other data similarly represented as physical quantities within the wireless device memories or registers or other such information storage, transmission or display devices.

Figure 1:
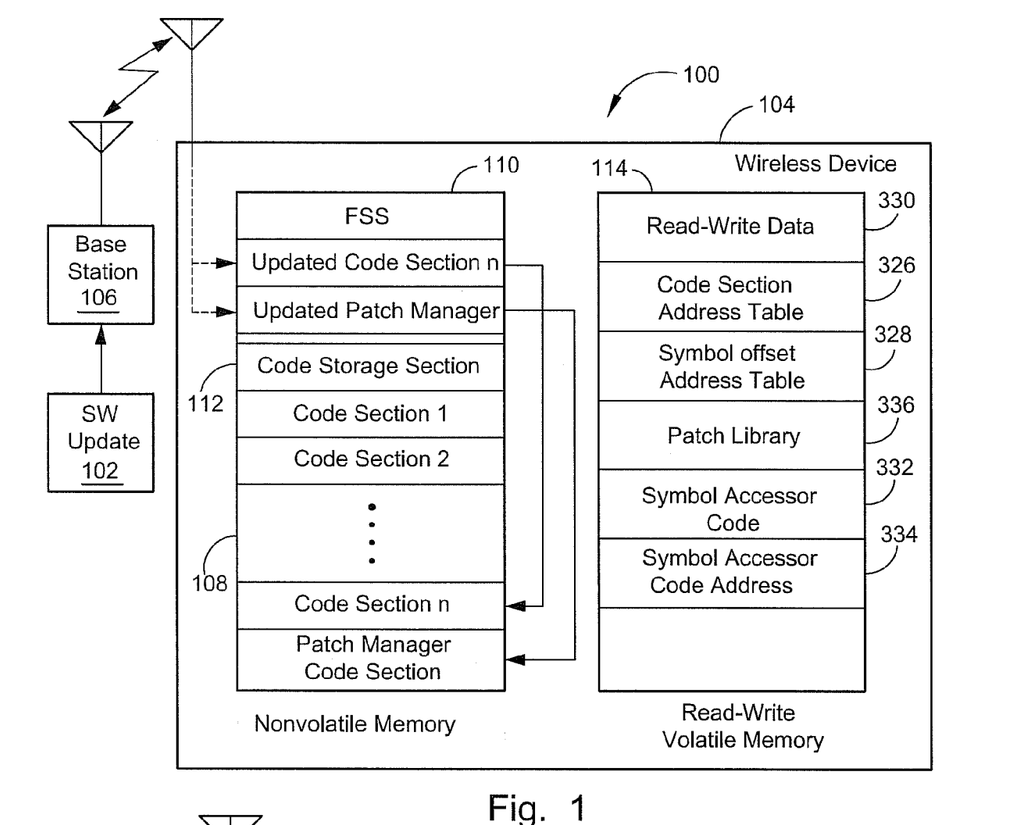
FIG. 1 is a schematic block diagram of the overall wireless device software maintenance system.

FIG. 1 is a schematic block diagram of the overall wireless device software maintenance system 100. The present invention system software organization is presented in detail below, following a general overview of the software maintenance system 100. The general system 100 describes a process of delivering system software updates and instruction sets (programs), and installing the delivered software in a wireless device. System software updates or patch manager run time instructions (PMRTI) are created by the manufacturer of the handsets. The system software is organized into symbol libraries. The symbol libraries are arranged into code sections. When symbol libraries are to be updated, the software update 102 is transported as one or more code sections. The software update is broadcast to wireless devices in the field, of which wireless communications device 104 is representative, or transmitted in separate communications from a base station 106 using well known, conventional air, data or message transport protocols. The invention is not limited to any particular transportation format, as the wireless communications device can be easily modified to process any available over-the-air transport protocol for the purpose of receiving system software and PMRTI updates.

The system software can be viewed as a collection of different subsystems. Code objects can be tightly coupled into one of these abstract subsystems and the resulting collection can be labeled as a symbol library. This provides a logical breakdown of the code base and software patches and fixes can be associated with one of these symbol libraries. In most cases, a single update is associated with one, or at most two, symbol libraries. The rest of the code base, the other symbol libraries, remain unchanged.

The notion of symbol libraries provides a mechanism to deal with code and constants. The read-write (RW) data, on the other hand, fits into a unique individual RW library that contains RAM based data for all libraries.

Once received by the wireless device 104, the transported code section must be processed. This wireless device overwrites a specific code section of nonvolatile memory 108. The nonvolatile memory 108 includes a file system section (FSS) 110 and a code storage section 112. The code section is typically compressed before transport in order to minimize occupancy in the FSS 110. Often the updated code section will be accompanied by its RW data, which is another kind of symbol library that contains all the RW data for each symbol library. Although loaded in random access volatile read-write memory 114 when the system software is executing, the RW data always needs to be stored in the nonvolatile memory 108, so it can be loaded into random access volatile read-write memory 114 each time the wireless device is reset. This includes the first time RW data is loaded into random access volatile read-write memory. As explained in more detail below, the RW data is typically arranged with a patch manager code section.

The system 100 includes the concept of virtual tables. Using such tables, symbol libraries in one code section can be patched (replaced), without breaking (replacing) other parts of the system software (other code sections). Virtual tables execute from random access volatile read-write memory 114 for efficiency purposes. A code section address table and symbol offset address table are virtual tables.

The updated code sections are received by the wireless device 104 and stored in the FSS 110. A wireless device user interface (UI) will typically notify the user that new software is available. In response to UI prompts the user acknowledges the notification and signals the patching or updating operation. Alternately, the updating operation is performed automatically. The wireless device may be unable to perform standard communication tasks as the updating process is performed. The patch manager code section includes a non-volatile read-write driver symbol library that is also loaded into random access volatile read-write memory 114. The non-volatile read-write driver symbol library causes code sections to be overwritten with updated code sections. As shown in the figure, code section n and the patch manager code sections are overwritten with updated code sections. The patch manager code section includes the read-write data, code section address table, and symbol offset address table, as well a symbol accessor code and the symbol accessor code address (discussed below). Portions of this data are invalid when updated code sections are introduced, and an updated patch manager code sections includes read-write data, a code section address table, and a symbol offset address table valid for the updated code sections. Once the updated code sections are loaded into the code storage section 112, the wireless device is reset. Following the reset operation, the wireless device can execute the updated system software. It should also be understood that the patch manager code section may include other symbol libraries that have not been discussed above. These other symbol libraries need not be loaded into read-write volatile memory 114.

Figure 2:
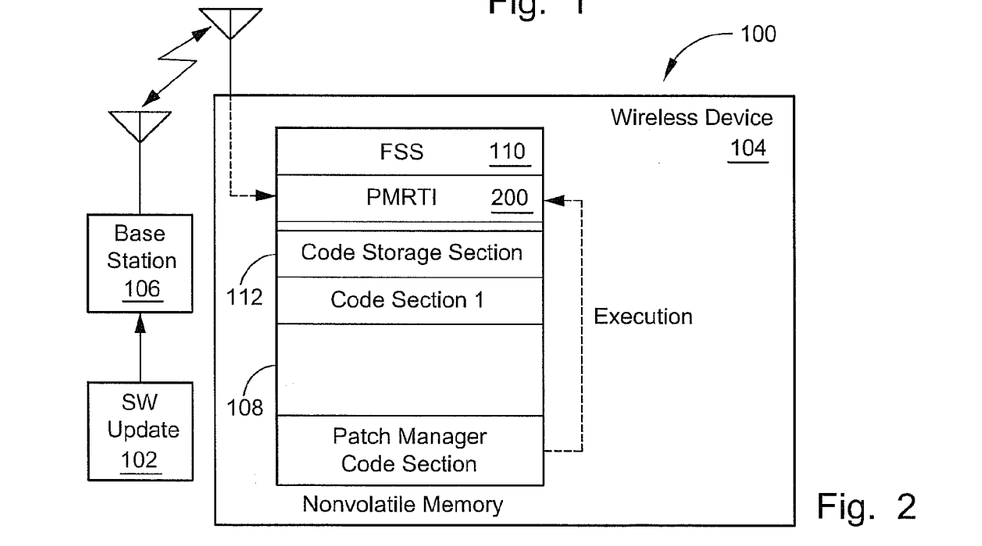
FIG. 2 is a schematic block diagram of the software maintenance system, highlighting the installation of instruction sets via the airlink interface.

FIG. 2 is a schematic block diagram of the software maintenance system 100, highlighting the installation of instruction sets via the airlink interface. In addition to updating system software code sections, the maintenance system 100 can download and install instructions sets or programs, referred to herein as patch manager run time instructions (PMRTI). The PMRTI code section 200 is transported to the wireless device 104 in the same manner as the above-described system software code sections. PMRTI code sections are initially stored in the FSS 110. A PMRTI code section is typically a binary file that may be visualized as compiled instructions to the handset. A PMRTI code section is comprehensive enough to provide for the performance of basic mathematical operations and the performance of conditionally executed operations. For example, an RF calibration PMRTI could perform the following operations:

IF RF CAL ITEM IS LESS THAN X
EXECUTE INSTRUCTION
ELSE
EXECUTE INSTRUCTION

A PMRTI can support basic mathematical operations, such as: addition, subtraction, multiplication, and division. As with the system software code sections, the PMRTI code section may be loaded in response to UI prompts, and the wireless device must be reset after the PMRTI is loaded into code storage section 112. Then the PMRTI section can be executed. If the PMRTI code section is associated with any virtual tables or read-write data, an updated patch manager code section will be transported with the PMRTI for installation in the code storage section 112. Alternately, the PMRTI can be kept and processed from the FSS 110. After the handset 104 has executed all the instructions in the PMRTI section, the PMRTI section can be deleted from the FSS 110.

In some aspects of the invention, the organization of the system software into symbol libraries may impact the size of the volatile memory 114 and nonvolatile memory 108 required for execution. This is due to the fact that the code sections are typically larger than the symbol libraries arranged in the code sections. These larger code sections exist to accommodate updated code sections. Organizing the system software as a collection of libraries impacts the nonvolatile memory size requirement. For the same code size, the amount of nonvolatile memory used will be higher due to the fact that code sections can be sized to be larger than the symbol libraries arranged within.

PMRTI is a very powerful runtime instruction engine. The handset can execute any instruction delivered to it through the PMRTI environment. This mechanism may be used to support RF calibrations and PRI updates. More generally, PMRTI can be used to remote debug wireless device software when software problems are recognized by the manufacturer or service provider, typically as the result of user complaints. PMRTI can also record data needed to diagnose software problems. PMRTI can launch newly downloaded system applications for data analysis, debugging, and fixes. PMRTI can provide RW data based updates for analysis and possible short term fix to a problem in lieu of an updated system software code section. PMRTI can provide memory compaction algorithms for use by the wireless device.

Once software updates have been delivered to the wireless device, the software maintenance system 100 supports memory compaction. Memory compaction is similar to disk de-fragmentation applications in desktop computers. The compaction mechanism ensures that memory is optimally used and is well balanced for future code section updates, where the size of the updated code sections are unpredictable. The system 100 analyzes the code storage section as it is being patched (updated). The system 100 attempts to fit updated code sections into the memory space occupied by the code section being replaced. If the updated code section is larger than the code section being replaced, the system 100 compacts the code sections in memory 112. Alternately, the compaction can be calculated by the manufacturer or service provider, and compaction instructions can be transported to the wireless device 104.

Compaction can be a time consuming process owing to the complexity of the algorithm and also the vast volume of data movement. The compaction algorithm predicts feasibility before it begins any processing. UI prompts can be used to apply for permission from the user before the compaction is attempted.

In some aspects of the invention, all the system software code sections can be updated simultaneously. A complete system software upgrade, however, would require a larger FSS 110.

Figure 3:
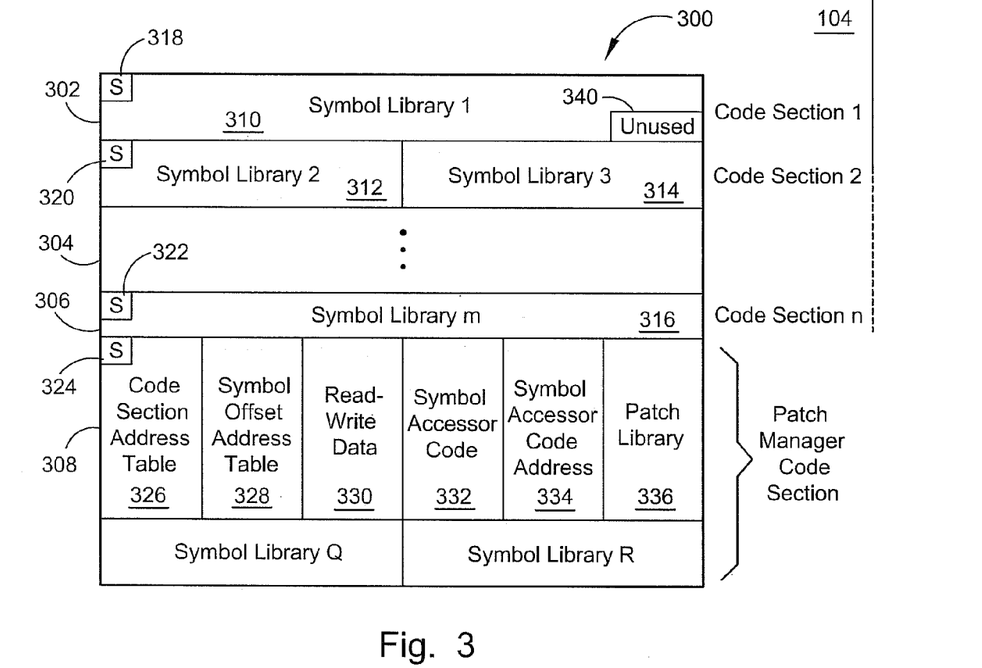
FIG. 3 is a schematic block diagram of the present invention field upgradeable system software structure, for use in the wireless communications device.

FIG. 3 is a schematic block diagram of the present invention field upgradeable system software structure, for use in the wireless communications device 104. The system software structure 300 comprises executable system software differentiated into a second plurality of code sections. Shown are code sections one (302), two (304), and n (306), as well as the patch manager code section 308, however the invention is not limited to any particular number of code sections. The system 300 further comprises a first plurality of symbol libraries arranged into the second plurality of code sections. Shown are symbol library one (310) arranged in code section one (302), symbol libraries two (312) and three (314) arranged in code section two (304), and symbol library m (316) arranged in code section n (306). Each library comprises symbols having related functionality. For example, symbol library one (310) may be involved in the operation of the wireless device liquid crystal display (LCD). Then, the symbols would be associated with display functions. As explained in detail below, additional symbol libraries are arranged in the patch manger code section 308.

Figure 4:
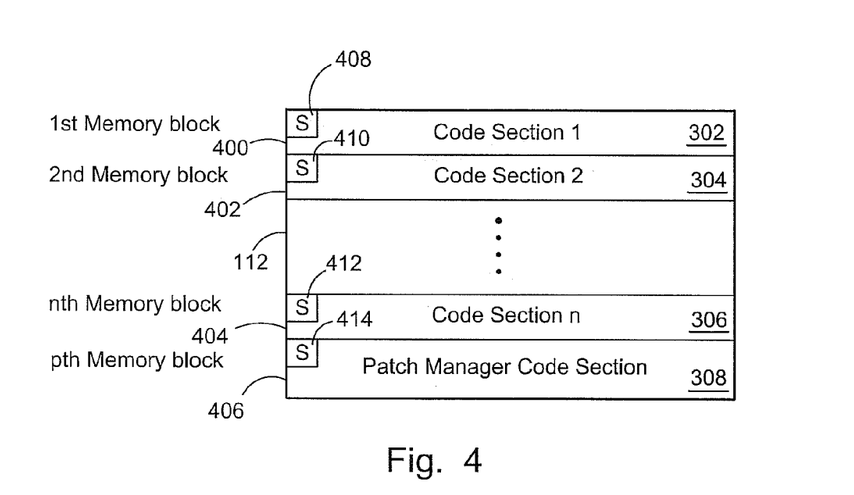
FIG. 4 is a schematic block diagram of the wireless device memory.

FIG. 4 is a schematic block diagram of the wireless device memory. As shown, the memory is the code storage section 112 of FIG. 1. The memory is a writeable, nonvolatile memory, such as Flash memory. It should be understood that the code sections need not necessarily be stored in the same memory as the FSS 110. It should also be understood that the present invention system software structure could be enabled with code sections stored in a plurality of cooperating memories. The code storage section 112 includes a second plurality of contiguously addressed memory blocks, where each memory block stores a corresponding code section from the second plurality of code sections. Thus, code section one (302) is stored in a first memory block 400, code section two (304) in the second memory block 402, code section n (306) in the nth memory block 404, and the patch manager code section (308) in the pth memory block 406.

Contrasting FIGS. 3 and 4, the start of each code section is stored at corresponding start addresses in memory, and symbol libraries are arranged to start at the start of code sections. That is, each symbol library begins at a first address and runs through a range of addresses in sequence from the first address. For example, code section one (302) starts at the first start address 408 (marked with "S") in code storage section memory 112. In FIG. 3, symbol library one (310) starts at the start 318 of the first code section. Likewise code section two (304) starts at a second start address 410 (FIG. 4), and symbol library two starts at the start 320 of code section two (FIG. 3). Code section n (306) starts at a third start address 412 in code storage section memory 112 (FIG. 4), and symbol library m (316) starts at the start of code section n 322 (FIG. 3). The patch manager code section starts at pth start address 414 in code storage section memory 112, and the first symbol library in the patch manager code section 308 starts at the start 324 of the patch manager code section. Thus, symbol library one (310) is ultimately stored in the first memory block 400. If a code section includes a plurality of symbol libraries, such as code section two (304), the plurality of symbol libraries are stored in the corresponding memory block, in this case the second memory block 402.

In FIG. 3, the system software structure 300 further comprises a code section address table 326 as a type of symbol included in a symbol library arranged in the patch manager code section 308. The code section address table cross-references code section identifiers with corresponding code section start addresses in memory.

Figure 5:
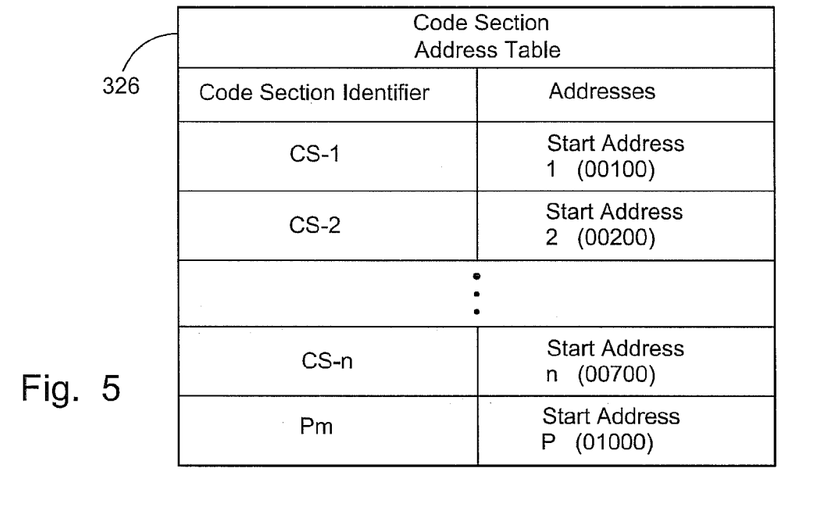
FIG. 5 is a table representing the code section address table of FIG. 3.

FIG. 5 is a table representing the code section address table 326 of FIG. 3. The code section address table 326 is consulted to find the code section start address for a symbol library. For example, the system 300 seeks code section one when a symbol in symbol library one is required for execution. To find the start address of code section one, and therefore locate the symbol in symbol library one, the code section address table 326 is consulted. The arrangement of symbol libraries in code sections, and the tracking of code sections with a table permits the code sections to be moved or expanded. The expansion or movement operations may be needed to install upgraded code sections (with upgraded symbol libraries).

Returning to FIG. 3, it should be noted that not every symbol library necessarily starts at the start of a code section. As shown, symbol library three (314) is arranged in code section two (304), but does not start of the code section start address 320. Thus, if a symbol in symbol library 3 (314) is required for execution, the system 300 consults the code section address table 326 for the start address of code section two (304). As explained below, a symbol offset address table permits the symbols in symbol library three (314) to be located. It does not matter that the symbols are spread across multiple libraries, as long as they are retained with the same code section.

As noted above, each symbol library includes functionally related symbols. A symbol is a programmer-defined name for locating and using a routine body, variable, or data structure. Thus, a symbol can be an address or a value. Symbols can be internal or external. Internal symbols are not visible beyond the scope of the current code section. More specifically, they are not sought by other symbol libraries, in other code sections. External symbols are used and invoked across code sections and are sought by libraries in different code sections. The symbol offset address table typically includes a list of all external symbols.

For example, symbol library one may generate characters on a wireless device display. Symbols in this library would, in turn, generate telephone numbers, names, the time, or other display features. Each feature is generated with routines, referred to herein as a symbol. For example, one symbol in symbol library one (310) generates telephone numbers on the display. This symbol is represented by an "X", and is external. When the wireless device receives a phone call and the caller ID service is activated, the system must execute the "X" symbol to generate the number on the display. Therefore, the system must locate the "X" symbol.

Figure 6:
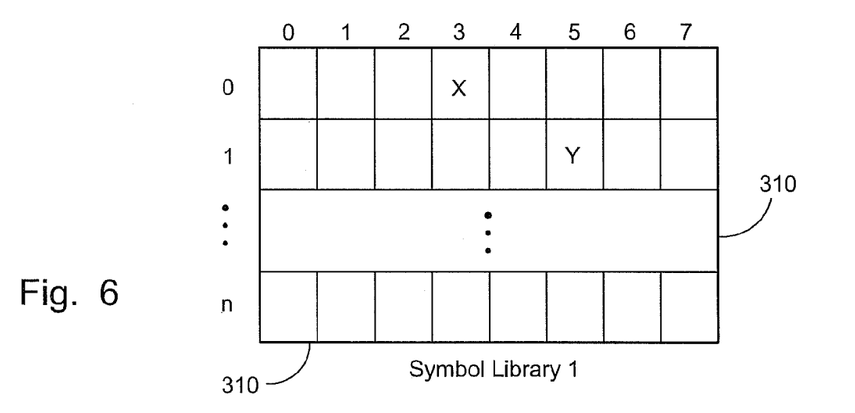
FIG. 6 is a detailed depiction of symbol library one of FIG. 3, with symbols.

FIG. 6 is a detailed depiction of symbol library one (310) of FIG. 3, with symbols. Symbols are arranged to be offset from respective code section start addresses. In many circumstances, the start of the symbol library is the start of a code section, but this is not true if a code section includes more than one symbol library. Symbol library one starts at the start of code section one (see FIG. 3). As shown in FIG. 6, the "X" symbol is located at an offset of (03) from the start of the symbol library and the "Y" symbol is located at an offset of (15). The symbol offset addresses are stored in a symbol offset address table 328 in the patch manager code section (see FIG. 3).

Figure 7:
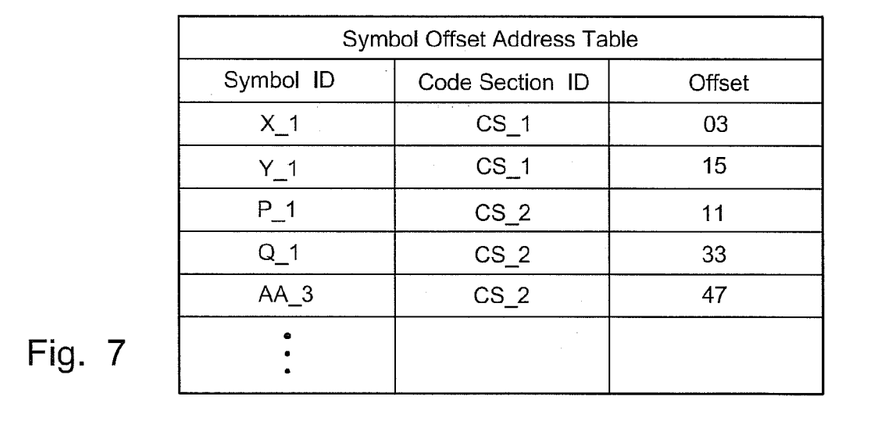
FIG. 7 is a table representing the symbol offset address table of FIG. 3.

FIG. 7 is a table representing the symbol offset address table 328 of FIG. 3. The symbol offset address table 328 cross-references symbol identifiers with corresponding offset addresses, and with corresponding code section identifiers in memory. Thus, when the system seeks to execute the "X" symbol in symbol library one, the symbol offset address table 328 is consulted to located the exact address of the symbol, with respect to the code section in which it is arranged.

Returning to FIG. 3, the first plurality of symbol libraries typically all include read-write data that must be consulted or set in the execution of these symbol libraries. For example, a symbol library may include an operation dependent upon a conditional statement. The read-write data section is consulted determine the status required to complete the conditional statement. The present invention groups the read-write data from all the symbol libraries into a shared read-write section. In some aspects of the invention, the read-write data 330 is arranged in the patch manager code section 308. Alternately (not shown), the read-write data can be arranged in a different code section, code section n (306), for example.

The first plurality of symbol libraries also includes symbol accessor code arranged in a code section to calculate the address of a sought symbol. The symbol accessor code can be arranged and stored at an address in a separate code section, code section 2 (304), for example. However, as shown, the symbol accessor code 332 is arranged and stored at an address in the patch manager code section 308. The system software structure 300 further comprises a first location for storage of the symbol accessor code address. The first location can be a code section in the code storage section 112, or in a separate memory section of the wireless device (not shown). The first location can also be arranged in the same code section as the read-write data. As shown, the first location 334 is stored in the patch manager code section 308 with the read-write data 330, the symbol offset address table 328, the code section address table 326, and the symbol accessor code 332, and the patch library (patch symbol library) 336.

The symbol accessor code uses the code section address table and symbol offset address tables to find the exact address of a sought symbol in memory. That is, the symbol accessor code accesses the code section address table and the symbol offset address table to calculate the address of the sought symbol. For example, if the "X" symbol in symbol library one is sought, the symbol accessor is invoked to seek the symbol identifier (symbol ID) X_1, corresponding to the "X" symbol (see FIG. 7). The symbol accessor code consults the symbol offset address to determine that the X_1 symbol identifier has an offset of (03) from the start of code section one (see FIG. 6). The symbol accessor code is invoked to seek the code section identifier CS_1, corresponding to code section one. The symbol accessor code consults the code section address table to determine the start address associated with code section identifier (code section ID) CS_1. In this manner, the symbol accessor code determines that the symbol identifier X_1 is offset (03) from the address of (00100), or is located at address (00103).

The symbol "X" is a reserved name since it is a part of the actual code. In other words, it has an absolute data associated with it. The data may be an address or a value. The symbol identifier is an alias created to track the symbol. The symbol offset address table and the code section address table both work with identifiers to avoid confusion with reserved symbol and code section names. It is also possible that the same symbol name is used across many symbol libraries. The use of identifiers prevents confusion between these symbols.

Returning to FIG. 1, the system software structure 300 further comprises a read-write volatile memory 114, typically random access memory (RAM). The read-write data 330, code section address table 326, the symbol offset address table 328, the symbol accessor code 332, and the symbol accessor code address 334 are loaded into the read-write volatile memory 114 from the patch manager section for access during execution of the system software. As is well known, the access times for code stored in RAM is significantly less than the access to a nonvolatile memory such as Flash.

Returning to FIG. 3, it can be noted that the symbol libraries need not necessarily fill the code sections into which they are arranged, although the memory blocks are sized to exactly accommodate the corresponding code sections stored within. Alternately stated, each of the second plurality of code sections has a size in bytes that accommodates the arranged symbol libraries, and each of the contiguously addressed memory blocks have a size in bytes that accommodates corresponding code sections. For example, code section one (302) may be a 100 byte section to accommodate a symbol library having a length of 100 bytes. The first memory block would be 100 bytes to match the byte size of code section one. However, the symbol library loaded into code section 1 may be smaller than 100 bytes. As shown in FIG. 3, code section one (302) has an unused section 340, as symbol library one (310) is less than 100 bytes. Thus, each of the second plurality of code sections may have a size larger than the size needed to accommodate the arranged symbol libraries. By "oversizing" the code sections, larger updated symbol libraries can be accommodated.

Figure 8A:
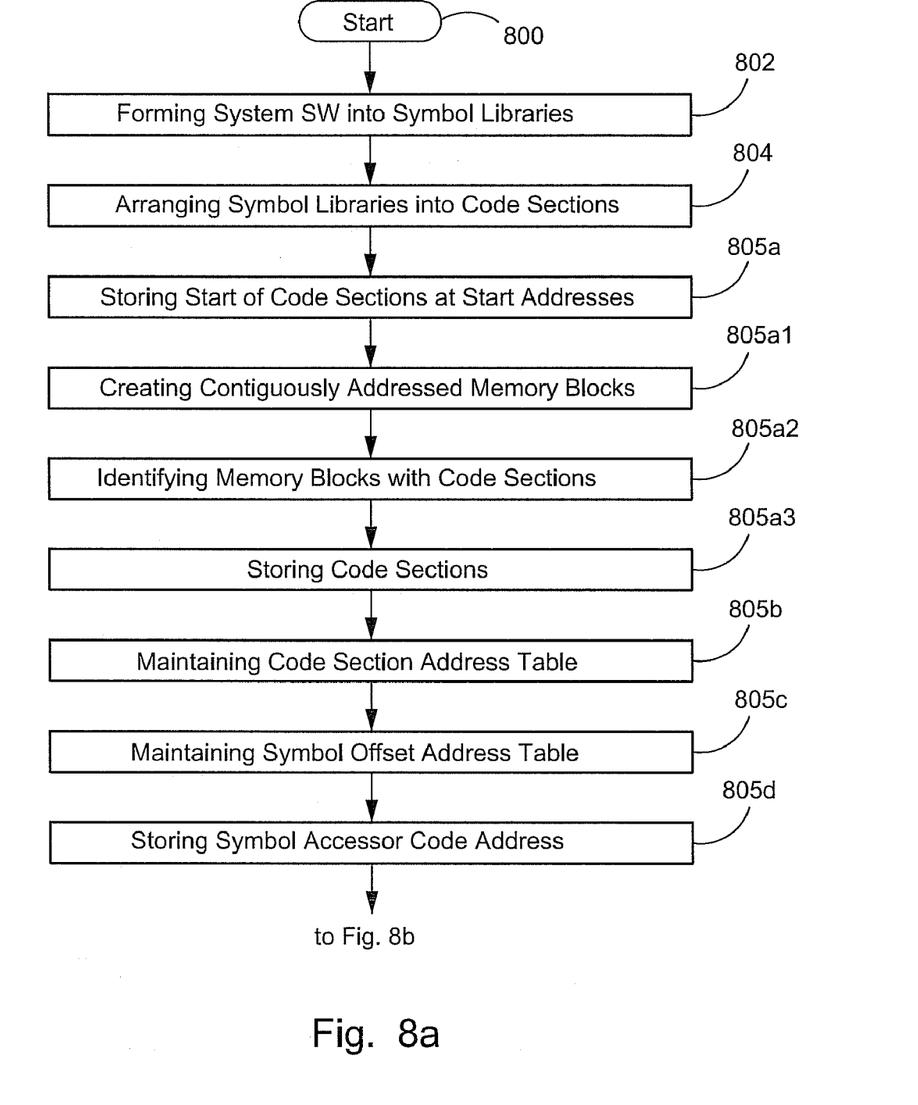
FIGS. 8*a* and 8*b* are flowcharts illustrating the present invention method for organizing field upgradeable system software in a wireless communications device.
Figure 8B:
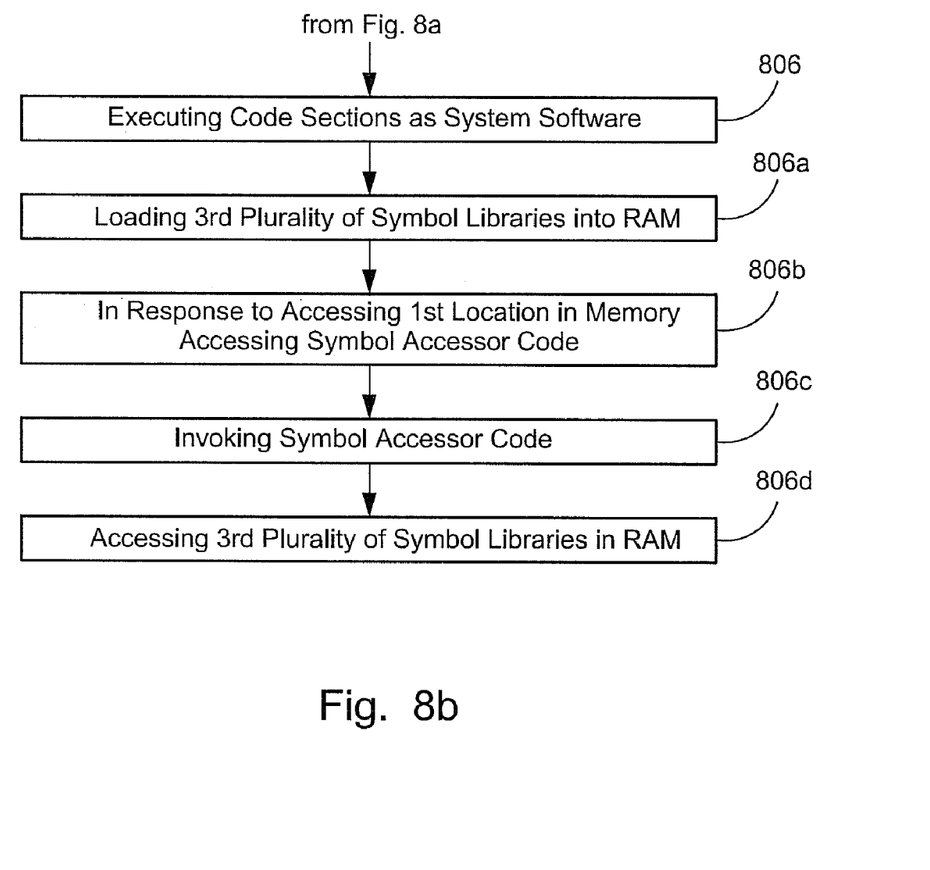

FIGS. 8a and 8b are flowcharts illustrating the present invention method for organizing field upgradeable system software in a wireless communications device. Although the method is depicted as a sequence of numbered steps for clarity, no order should be inferred from the numbering unless explicitly stated. The method begins at Step 800. Step 802 forms system software into a first plurality of symbol libraries, each symbol library comprising symbols having related functionality. Step 804 arranges the first plurality of symbol libraries into a second plurality of code sections. Step 806 executes the wireless device system software.

Arranging the first plurality of symbol libraries into a second plurality of code sections in Step 804 includes starting symbol libraries at the start of code sections, and the method comprises further steps. Step 805a stores the start of code sections at corresponding start addresses. Step 805b maintains a code section address table cross-referencing code section identifiers with corresponding start addresses.

Arranging the first plurality of symbol libraries into a second plurality of code sections in Step 804 includes arranging symbols to be offset from their respective code section start addresses. Then, Step 805c maintains a symbol offset address table cross-referencing symbol identifiers with corresponding offset addresses, and corresponding code section identifiers.

In some aspects of the invention, forming system software code into a first plurality of symbol libraries in Step 802 includes forming read-write data for the plurality of symbol libraries. Arranging the first plurality symbol libraries into a second plurality of code sections in Step 804 includes arranging the read-write data in a shared read-write code section.

In some aspects of the invention, forming system software code into a first plurality of symbol libraries in Step 802 includes forming a symbol accessor code, and arranging the first plurality of symbol libraries into a second plurality of code sections in Step 804 includes arranging the symbol accessor code in a first code section. Then, the method comprises further a step. Step 805d stores the symbol accessor code address in a first location in memory. Then, executing the code sections as system software in Step 806 includes substeps. Step 806a loads a third plurality of symbol libraries into read-write volatile memory, typically RAM. The third plurality of symbol libraries need not necessarily include all the symbol libraries in the patch manager code section. The third plurality of symbol libraries can also include symbol libraries arranged in other code sections besides the patch manager code section. Step 806b, in response to referencing the first location in memory, accesses the symbol accessor code. Step 806c invokes the symbol accessor code to calculate the address of a sought symbol using a corresponding symbol identifier, and a corresponding code section identifier. Step 806d accesses the third plurality of symbol libraries in RAM.

Invoking the symbol accessor code to calculate the address of the sought symbol in Step 806b includes accessing the code section address table and the symbol offset address table to calculate the address of the sought symbol. Typically, storing the symbol accessor code address in a first location in memory in Step 805d includes storing the symbol accessor code address in the first code section.

In some aspects of the invention, arranging the first plurality of symbol libraries into a second plurality of code sections in Step 804 includes arranging read-write data, the code section address table, the symbol offset address table, and the symbol accessor code in the first code section, typically the patch manager code section. Then, Step 806a loads the read-write data, the code section address table, the symbol offset address table, the symbol accessor code, and the symbol accessor code address from the first code section into read-write volatile memory (typically RAM). Step 806d accesses the read-write data, the code section address table, the symbol offset address table, the symbol accessor code, and the symbol accessor code address from read-write volatile memory.

Storing the start of code sections at corresponding start addresses in Step 805a includes substeps. Step 805a1 creates a second plurality of contiguously addressed memory blocks. Step 805a2 identifies each memory block with a corresponding code section. Step 805a3 stores code sections in the identified memory blocks.

In some aspects of the invention, arranging the first plurality of symbol libraries into a second plurality of code sections in Step 804 includes arranging a third plurality of symbol libraries in a first code section. Then, identifying each memory block with a corresponding code section in Step 805a2 includes identifying a first memory block with the first code section, and storing code sections in the identified memory blocks in Step 805a3 includes storing the third plurality of symbol libraries in the first memory block.

Alternately, arranging the first plurality of symbol libraries into a second plurality of code sections in Step 804 includes arranging a first symbol library in a first code section. Then, identifying each memory block with a corresponding code section in Step 805a3 includes identifying a first memory block with the first code section, and storing code sections in the identified memory blocks in Step 805a3 includes storing the first symbol library in the first memory block.

Arranging the first plurality of symbol libraries into a second plurality of code sections in Step 804 includes sizing the code sections to accommodate arranged symbol libraries. Then, creating a second plurality of contiguously addressed memory blocks in Step 805a1 includes sizing memory blocks to accommodate corresponding code sections. Alternately, arranging the first plurality of symbol libraries into a second plurality of code sections in Step 804 includes sizing the code sections to accommodate sizes larger than the arranged symbol libraries.

A system and method have been provided for organizing wireless device system software for field updates via an airlink interface. The system is easily updateable because of the arrangement of symbol libraries in code sections, with tables to access the start addresses of the code sections in memory and the offset addresses of symbols in the symbol libraries. Although a few examples of these library arrangements and cross-referencing tables have been given for a display function, the present invention is not limited to just these examples. Other variations and embodiments of the invention will occur to those skilled in the art.

We claim:

1. A wireless communication device comprising:
   a nonvolatile memory module comprising:
   a file system section (FSS) for storing a received updated code section and a received updated patch manager code section;
   a code storage section for storing a plurality of code sections, each code section of the plurality of code sections comprising at least one symbol library comprising a plurality of symbols having a related functionality; and
   a patch manager code section configured to overwrite at least one of the plurality of code sections comprising:
   a code section address table which stores a code section identifier and a start address for the each code section; and
   a symbol offset address table which stores an offset reference for each symbol of the plurality of symbols in the at least one symbol library stored in the each code section, the offset reference comprising an offset value derived from the start address of the each code section,
   wherein the patch manager code section is configured to control a system software update in response to a user acknowledgement that resets the wireless communication device, the system software update including copying a patch manager code section stored in the nonvolatile memory to a volatile memory notifying a user via a user interface that an updated code section and an updated patch manager code section has been received, receiving an acknowledgement from the user, suspending a communication task for the wireless communication device, overwriting at least a portion of a code section of the plurality of code sections with the updated code section and overwriting at least a portion of the patch manager code section with a portion of the updated patch manager code section by updating the code section address table and updating the symbol offset address table.

2. The wireless communication device of claim 1, wherein the updated patch manager code section is configured to enable a system software update to be implemented on the wireless communication device.

3. The wireless communication device of claim 1, wherein the patch manager code section further comprises:
   a read-write data section;
   a symbol accessor code section;
   a symbol accessor code address section; and
   a patch library.

4. The wireless communication device of claim 1, wherein the patch manager code section is loaded into a volatile memory upon a reset condition.

5. The wireless communication device of claim 1 wherein the received updated code section and the received updated patch manager code section define a system software update, and wherein each code section of the received code sections stores at least part of the system software update.

6. The wireless communication device of claim 1, wherein the at least one symbol library comprises a first symbol library, a second symbol library, and a third symbol library wherein the second symbol library and the third symbol library are arranged contiguously within a single code section.

7. A method for updating system software in a wireless communications device, the method comprising:
   copying a patch manager code section stored in a nonvolatile memory to a volatile memory;
   receiving a broadcasted system software update comprising an update code section and an update patch manager;
   notifying a user via a user interface that the wireless communication device has received the broadcasted system software update;
   receiving an acknowledgement from the user via the user interface;
   initiating an update operation in response to the acknowledgement, the update operation comprising,
   (1) suspending a communication task for the wireless communication device;
   (2) storing the system software update on a file system section of the nonvolatile memory,
   (3) overwriting at least a portion of a code section of a plurality of code sections stored in a code storage section of the nonvolatile memory with the update code section, each code section of the plurality of code sections comprising at least one symbol library, having a plurality of symbols of related functionality,
   (4) overwriting at least a portion of a patch manager code section of the nonvolatile memory with at least a portion of the update patch manager, comprising, updating a code section address table of the patch manager code section which stores a code section identifier and a start address for each code section of the plurality of code sections, updating a symbol offset address table which stores an offset reference for each symbol of the plurality of symbols in the at least one symbol library of the each code section, the offset reference comprising an offset value derived from the start address of the each code section, and
   (5) resetting the wireless communication device.

8. The method of claim 7 further comprising executing the system software update from the nonvolatile memory, copying a code storage section stored in the nonvolatile memory to the volatile memory.

9. The method of claim 7, wherein each symbol of the plurality of symbols is associated with a symbol access code, further comprising arranging the symbol access code in the corresponding symbol library.

10. The method of claim 9, further comprising referencing the symbol access code to calculate an address of a symbol.

11. The method of claim 10, wherein calculating an address of a symbol further comprises accessing the symbol offset address table to determine a corresponding code section identifier and a corresponding offset value; accessing the code section address table to determine a start address of the corresponding code section identifier; and calculating the address of the symbol based on the offset value and the start address.

12. The method of claim 9 further comprising associating a first symbol access code with a first symbol library of the at least one symbol library and associating a second symbol access code with a second symbol library of the at least one symbol library.

13. The method of claim 12, further comprising associating a third symbol access code with a third symbol library of the at least one symbol library, wherein the third symbol access code is stored contiguously to the second symbol library.

* * * * *